United States Patent Office 3,446,651
Patented May 27, 1969

3,446,651
PLASTIC FILM COATED WITH ANTISTATIC AGENT
Margaret C. Clachan, Patrick Terrence McGrail, and Basil R. Shephard, Essex, England, assignors to Bexford Limited, Essex, England, a British company
No Drawing. Filed Feb. 14, 1966, Ser. No. 527,046
Claims priority, application Great Britain, Feb. 18, 1965, 7,073/65
Int. Cl. B44d 1/16; B44 1/24
U.S. Cl. 117—73          10 Claims

ABSTRACT OF THE DISCLOSURE

An antistatic agent for plastic films obtained by reacting a polymer containing cyclic anhydride groups with a compound containing both phenolic and sulphonic groups. The treatment of plastic films by coating them with the antistatic agents is also disclosed.

---

The invention relates to new antistatic agents and to the treatment of films of plastics, which may bear coatings on one or both sides, to render them less liable to accumulate static electricity during further processing for use and to the resultant film products which have a low tendency to accumulate static electricity.

It well known that most films of plastics tend to accumulate static charge in handling processes such as reeling, unreeling, passage over rollers or transport of sheets, during which processes there is rubbing of the film or separation of two surfaces of the film or of the film surface from another surface.

In most processes and uses the presence of static charge is most undesirable and gives rise to hazard of fire, hazard of electric shock, inconvenient sticking of sheets of the film either together or to other surfaces, accumulation of dust on the film, and, in photographic film, undesirable marking of the emulsion by static discharges.

Treatment of one or both surfaces of a film of plastic, which may already bear other coatings, with an agent which increases electrical conductivity is the usual method of avoiding static accumulation. For this purpose many substances have been described including inorganic salts, salts of carboxylic, sulphonic or phosphoric acids, amine and quaternary salts and other substances of ionic or highly polar character. Many of these substances although conductive and hence antistatic per se are defective in practice for reasons such as failure to adhere to the substrate film surface, failure to form a coherent layer, insufficient antistatic effect frequently due to excessive penetration into the substrate, lack of persistance of the antistatic effect after handling or after super-coating of the conducting layer, excessive hygroscopicity, excessive stickiness when the treated film is heated at temperatures up to 100° C. Furthermore, for photographic purposes, the agents used must not effect the sensitometric behaviour of the film.

It is an object of the present invention to provide a new class of antistatic agents, to provide films of plastics carrying layers comprising such antistatic agents, and to provide processes for reducing the tendency of films of plastics to accumulate static electricity by the use of such antistatic agents.

According to a first feature of the present invention, there are provided, as new chemical compounds, the products obtainable by reaction of a polymer containing cyclic carboxylic anhydride groups with a compound having both phenolic and sulphonic groups. Such compounds are characterised in that they contain the structure

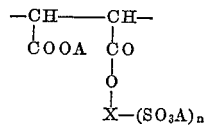

where A represents hydrogen or alkali metal atoms and are the same or different; where X represents an aromatic nucleus, for example, a benezenoid or naphthenoid nucleus where the group or groups —(SO$_3$A)$_n$ are attached directly to the aromatic nucleus and where $n$ may be 1, 2 or 3.

According to a further feature of the invention, there is provided a process for the production of an antistatic agent which comprises reacting a polymer containing cyclic carboxylic anhydride groups with a phenolic mono- or poly-sulphonic acid. Phenol ortho- or para-sulphonic acid or a mixture of these are preferred, while a non-exhaustive list of suitable phenolic sulphonic acids are: phenol disulphonic acid, 2:6 dichlorophenol-4-sulphonic acid, meta-cresol sulphonic acid, meta- or para-xylenol sulphonic acid, 2-naphthol 6:8-disulphonic acid, 2-naphthol 7-sulphonic acid, 1-naphthol 4-sulphonic acid and 2-naphthol 2:6 disulphonic acid. The reaction is preferably carried out in the presence of an alkaline substance, such as sodium bicarbonate, carbonate or hydroxide, or the phenolic sulphonic acid may be used in the form of the salt of the sulphonic function, or used in the form of the salt of both the sulphonic and the phenolic functions. Reaction may be carried out in water or in organic solvent medium, preferably dimethylformamide, pyridine or N-methylpyrrolidone. Where appropriate and after reaction, the polymer bearing phenyl sulphonic groups and carboxylic groups may be adjusted by addition of mineral acid or alkali to give any desired level of neutralisation of the sulphonic and carboxylic groups.

The polymer containing cyclic carboxylic anhydride side groups used as starting material, may be a copolymer of a cyclic unsaturated anhydride derived from a dicarboxylic acid having unsaturation alpha-beta to a carboxylic acid group. Typical examples are maleic and itaconic anhydrides. These anhydrides are known to form copolymers with other monomers such as ethylene, methyl vinyl ether, methyl methacrylate and styrene. The copolymers commonly have an alternating structure of the segments derived from the two monomers but for the purposes of this invention not all of the anhydride groups need be utilised in reaction with phenol sulphonic acid.

The reaction products and conditions of reaction used for the preparation of the antistatic compounds are preferably such that the products contain from 0.5% to 10% of sulphur and have sulphated ash contents of 6% to 65%.

The following examples will serve to illustrate the preparation of antistatic agents according to the invention:

EXAMPLE 1

Phenol sulphonic acid, sodium salt dihydrate (23.2 g.) was dissolved in water (100 ml.) containing sodium hydroxide (4.0 g.). The solution was stirred and heated to 60–80° C. while a commercial methyl vinyl ether-maleic anhydride copolymer (15.6 g. Gantrez AN139, General Aniline and Film Corporation) was slowly added portionwise during 30 mins. Stirring and heating was continued for a further 12 hrs. while the anhydride resin slowly reacted and dissolved. After cooling, the product was precipitated as a white powder by addition of acetone. This was further purified by redissolution in water and reprecipitation. The dried product was soluble in water and in water-miscible solvents containing small proportions of water and from the latter solvent mixture could be cast to a colourless transparent hard film. The product had a sulphur content of 2.75% and a sulphated ash content of 27.0%.

EXAMPLE 2

Phenol sulphonic acid sodium salt dihydrate was dehydrated by removal of the water azeotropically with xylene and the anhydrous salt was recovered by filtration and drying.

The anhydrous salt (19.6 g.) was added to a solution of a commercial ethylene-maleic anhydride copolymer (12.6 g.; DX840-11, Monsanto Chemical Co. Ltd.) in dimethyl formamide (50 ml.) and the mixture heated under reflux for three hours. Addition of acetone gave a white deposit of a product (30 g.) which was dissolved in a solution of sodium hydroxide (3.8 g.) in water (100 ml.). The antistatic polymer was precipitated by addition to acetone and was further purified by dissolution in water and reprecipitation. After drying, the white powder had a sulphur content of 5.8% and a sulphated ash content of 36.7%.

EXAMPLE 3

An antistatic agent was prepared using the same quantities of materials as described in Example 1, except that 20.2 g. of a copolymer of styrene and maleic anhydride in 1:1 molar ratio was used instead of the resin AN139. The sulphur content of the product was 3.6% and sulphated ash content was 29.2%.

According to a further feature of the invention there are provided films of plastics of reduced tendency to accumulate static electricity which comprise as a layer on said film, a layer comprising an antistatic agent as aforesaid. The agents may be applied to film products by any methods including bead or dip coating using 0.1–2% w./v. solutions in volatile ketones or alcohols, preferably containing 2–20 v./v. of water. They may also be applied from water alone, and, if needed, wetting agents or supplementary antistatic agents such as inorganic salts or organic antistatic agents may be added. The antistatic agents which are the subject of the present invention can be applied to one or both sides of uncoated films of plastics or to films of plastics already bearing coatings. Furthermore, an antistatic coated surface may be super-coated with another layer or layers, if needed, and in these cases the resultant composite film usually still shows considerable conductivity and antistatic behaviour.

Frequently a coating on a film product is required to show properties additional to those of an antistatic nature and such subsidiary properties can arise from the use of the antistatic agents of the present invention. For instance, film products with drafting properties (i.e. on which drawings may be made) are well-known and may be prepared by lacquering a film of plastic with compositions containing suitable translucence-producing and pencil-tooth producing finely divided solids such as silica and titania. Materials of this kind when coated with the antistatic materials described in Examples 1–3 not only have excellent antistatic behaviour and pencil tooth, but also have good acceptance of drawing inks, good adhesion of the inked line to the substrate and possess the capability of ready removal of the inked line by erasure.

Advantages additional to those of an antistatic nature may also be achieved by addition of natural or synthetic polymers to the solutions of the present antistatic agents prior to coating on to a film substrate.

With some film products it is necessary for the antistatic treatment to persist after the film product has been treated with water. This can be accomplished by adding curing or cross-linking materials to the solutions of the antistatic agents prior to coating, followed by heat treatment of the film. Any additive known to crosslink polymeric substances having carboxylic acid side groups may be used, such as hexamethoxymethyl melamine or a bis-epoxide.

The following examples will serve to illustrate the production of films of reduced tendency to accumulate static electricity. In these examples the coated films were equilibrated at 20° C. and 60% relative humidity prior to measurement of surface resistivity in ohms per square. While untreated film products frequently show surface resistivities of $10^{12}$–$16^{16}$ ohms/sq. and have unsatisfactory static behaviour the treated products of the present invention have surface resistivities of $10^7$–$10^{11}$ ohms/sq. and show excellent antistatic behaviour.

EXAMPLE 4

The antistatic agent of Example 1 was dissolved in 10% v./v. water in methanol to give a 0.4% w./v. solution. This solution was applied by means of a doctor roller to the secondary cellulose acetate side of a photographic film base consisting of a plasticised cellulose triacetate film previously coated on both sides with secondary cellulose acetate and on one side additionally with a layer of gelatin. After drying, the film showed a surface resistivity of $7.0 \times 10^9$ ohms/sq. on the treated side.

The side coated with gelatin was super-coated with a gelatino-silver halide emulsion and, during and after this process, no defects due to static were observed.

Antistatic agents of a similar type to those of Example 1 were made using similar resins known as types AN–119, AN–149 and AN–169 (General Aniline and Film Corporation) and when coated on to the same film substrate gave surface resistivities of 2.5, 3.5 and $1.5 \times 10^9$ ohms/sq., respectively.

EXAMPLE 5

The antistatic agent of Example 2 was applied to photographic film base as described in Example 4 and gave a product of surface resistivity of $5.0 \times 10^8$ ohms/sq.

An antistatic agent made as in Example 1 but using similarly the anhydride-containing resin DX840-31 (Monsanto Chemical Co. Ltd.), and the antistatic agent made as described in Example 3, gave coated photographic film products having surface resistivities of 2.0 and $1.0 \times 10^9$ ohms/sq., respectively.

EXAMPLE 6

The antistatic agent of Example 1 (0.5 g.) and lithium nitrate (0.5 g.) were dissolved in 10% v./v. water in methanol (100 ml.) and the solution was applied to both sides of a cellulose triacetate film already bearing successive coatings of secondary cellulose acetate and gelatin on both sides. After drying, the treated film showed surface resistivity of $1.0 \times 10^8$ ohms/sq. The antistatic layers were super-coated with gelatino-silver halide emulsion and, during and after this process, no defects due to static electricity were observed.

EXAMPLE 7

The antistatic agent described in Example 2 was dissolved in 15% v./v. water in methanol to give a 0.5% w./v. solution which was applied to a film of polyethylene terephthalate. After drying, the surface resistivity of the film was $1.2 \times 10^8$ ohms/sq. A similar solution prepared using the antistatic agent described in Example 3 gave a coated polyethylene terephthalate film having a surface resistivity of $3.5 \times 10^8$ ohms/sq.

EXAMPLE 8

A solution of the antistatic agent described in Example 1 in 15% v./v. water in methanol of 0.4% concentration was applied to a film of plasticised cellulose triacetate. After drying for 30 mins. at 80° C., followed by equilibration at 20° C. and 60% relative humidity the film had a surface resistivity of $0.5 \times 10^9$ ohms/sq.

A similar solution of the antistatic agent described in Example 2 and containing additionally 0.03% w./v. of Cationic SP (Monsanto Chemical Co. Ltd.) when coated on the same film substrate gave a surface resistivity of $1.0 \times 10^9$ ohms/sq.

EXAMPLE 9

A solution of the antistatic agent described in Example 2 (0.4 g.) and Cationic SP (0.03 g.) was made in 10% v./v. water in methanol (100 ml.). After coating on to plasticised secondary cellulose acetate film followed by drying, the surface resistivity of the film was $5 \times 10^{10}$ ohms/sq.

EXAMPLE 10

A solution of the antistatic agent described in Example 1 in 10% v./v. water in methanol of concentration 0.6% w./v. was applied to a silica-filled plasticised nitrocellulose layer previously coated on to a polyethylene terephthalate substrate. After drying the film has a surface resistivity of $5 \times 10^9$ ohms/sq.

A solution of the antistatic described in Example 3 (0.4 g.), hexamethoxymethyl melamine (0.1 g.) and paratoluene sulphonic acid (0.01 g.) in methanol (90 ml.) and water (10 ml.) was applied to a drafting film as above. After heating for 15 mins. at 105° C. the film had a surface resistivity of $2 \times 10^9$ ohms/sq. The coated film had excellent pencil-take and ink-take, did not collect dust and the antistatic behaviour persisted after sponging the surface with water and drying.

EXAMPLE 11

A solution of G-acid (2-naphthol 6,8-disulphonic acid potassium salt, 100 g.) and potassium hydroxide (22.4 g.) in water (650 ml.) was made. The solution was stirred and heated to 90° C. while a copolymer of styrene and maleic anhydride in 1:1 molar ratio (135 g.) was slowly added portion-wise during 30 minutes. Stirring and heating were continued for a further 18 hours while the anydride slowly reacted and dissolved. The reaction mixture was then cooled and the product was precipitated in excess acetone, redissolved in water and again precipitated in acetone. The dried product was soluble in water and in water-miscible solvents containing small proportions of water and from the latter solvent mixture could be cast as a colourless, transparent, hard film. The product had a sulphur content of 1.55% and a sulphated ash value of 31.4%.

EXAMPLE 12

A solution of F-acid (2-naphthol 7-sulphonic acid sodium salt, 24.6 g.) and sodium hydroxide (4.0 g.) was made in water (250 ml.). The reaction described in Example 4 was repeated using 20.2 g. of styrene-maleic anhydride copolymer.

The final product had a sulphur content of 3.45% and sulphated ash value of 25.0%.

EXAMPLE 13

The antistatic agent of Example 11 (0.5 g.) and lithium nitrate (0.5 g.) were dissolved in 10% v./v. water in methanol (100 ml.) and the solution was applied to both sides of a cellulose triacetate film already bearing successive coatings of secondary cellulose acetate and gelatine on both sides. After drying, the treated film showed a surface resistivity of $2.6 \times 10^9$ ohms/sq. The antistatic layers were super-coated with gelatino-silver halide emulsion and, during and after this process, no defects due to static electricity were observed.

EXAMPLE 14

The antistatic agent of Example 12 was used as described in Example 13, giving a treated film with surface resistivity of $3.4 \times 10^8$ ohms/sq. No defects due to static electricity were observed during or after the super-coating of the antistatic layers with gelatino-silver halide emulsion.

We claim as our invention:

1. A film of plastic reduced tendency to accumulate static electricity which comprises a film of plastic having thereon a layer comprising an antistatic agent which is a polymeric compound containing the structure

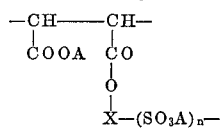

where the A groups are the same or different and are hydrogen or alkali metal atoms, X is an aromatic group, $n$ is 1, 2 or 3 and the $—(SO_3A)_n$ groups are attached directly to the aromatic nucleus.

2. A film of plastic according to claim 1 wherein the antistatic agent is the reaction product of a polymer comprising cyclic carboxylic anhydride groups with a compound containing both phenolic and sulphonic groups.

3. A film of plastic according to claim 1 wherein the antistatic agent is applied directly on the surface of the film.

4. A film of plastic according to claim 1 wherein the said antistatic agent is applied to the surface of a layer of lacquer, cellulosic or gelatin coating already on the film.

5. A film of plastic according to claim 4 wherein the coating layer already on the film is a layer of lacquer containing a finely divided solid in proportion sufficient to impart to the film the ability to write with a pencil on the film.

6. A film of plastic according to claim 1 wherein the said antistatic layer is itself supercoated with a gelatin coating layer.

7. A film of plastic according to claim 1 wherein the antistatic agent is contained in an applied layer which further includes a natural or synthetic film-forming polymer.

8. A film of plastic according to claim 1 wherein the layer of antistatic agent contains a cross-linking agent.

9. A film of plastic according to claim 8 wherein the cross-linking agent is hexamethoxymethyl melamine.

10. A film of plastic according to claim 8 wherein the cross-linking agent is a bis-epoxide.

References Cited

UNITED STATES PATENTS

| 2,964,423 | 12/1960 | Van Stappen. |
| 3,039,870 | 6/1962 | Laakso et al. |
| 3,115,420 | 12/1963 | Centa et al. |
| 3,147,301 | 9/1964 | Sheetz _____ 260—49 X |
| 3,201,251 | 8/1965 | Nadeau et al. |

WILLIAM D. MARTIN, *Primary Examiner.*

R. HUSACK, *Assistant Examiner.*

U.S. Cl. X.R.

117—76, 82, 83, 138.8, 145, 161; 260—49, 79.3